United States Patent
Worsley

(10) Patent No.: US 9,525,671 B1
(45) Date of Patent: Dec. 20, 2016

(54) SECURE ADDRESS RESOLUTION PROTOCOL

(71) Applicant: Amazon Technologies, Inc., Reno, NV (US)

(72) Inventor: Timothy Craig Worsley, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 13/744,293

(22) Filed: Jan. 17, 2013

(51) Int. Cl.
*H04L 29/06* (2006.01)

(52) U.S. Cl.
CPC ....... *H04L 63/0471* (2013.01); *H04L 63/0236* (2013.01)

(58) Field of Classification Search
CPC ........................ H04L 63/0227–63/0263; H04L 63/04–63/0492
USPC .................................................. 713/153–154
See application file for complete search history.

(56) References Cited

U.S. PATENT DOCUMENTS

| | | | | |
|---|---|---|---|---|
| 6,775,769 | B1 * | 8/2004 | Inada | H04L 63/0428 713/152 |
| 7,383,048 | B2 * | 6/2008 | Jouppi | H04W 28/24 370/310.1 |
| 7,397,797 | B2 * | 7/2008 | Alfieri | H04L 29/06 370/392 |
| 7,526,085 | B1 * | 4/2009 | Bong | 380/37 |
| 8,006,304 | B2 * | 8/2011 | Kwan | 726/23 |
| 8,122,243 | B1 * | 2/2012 | Farrington et al. | 713/154 |
| 8,233,429 | B1 * | 7/2012 | Fingerhut | 370/328 |
| 8,671,451 | B1 * | 3/2014 | Lambert | 726/25 |
| 2004/0193876 | A1 * | 9/2004 | Donley | H04L 1/1607 713/162 |
| 2009/0228708 | A1 * | 9/2009 | Trostle | H04L 63/0428 713/171 |
| 2009/0307474 | A1 * | 12/2009 | Johnston | 713/2 |

(Continued)

OTHER PUBLICATIONS

S-ARP: a Secure Address Resolution Protocol Bruschi, D. ; Dipt. di Informatica e Communicazione, Univ. degli Studi di Milano, Italy ; Ornaghi, A. ; Rosti, E. Computer Security Applications Conference, 2003. Proceedings. 19th Annual.*

(Continued)

*Primary Examiner* — Christopher Revak
*Assistant Examiner* — Vadim Savenkov
(74) *Attorney, Agent, or Firm* — Lee & Hayes, PLLC

(57) ABSTRACT

This disclosure describes, in part, systems, devices, and techniques to encrypt address resolution protocol (ARP) messages to prevent a rogue device from accessing information about a local network. In certain embodiments described herein, networked devices are preconfigured with security credentials that allow the devices, possibly via network interface controllers (NICs), to encrypt outgoing ARP messages and decrypt incoming ARP messages. The NICs may listen for encrypted messages that are recognized as being ARP messages. These encrypted messages may include a designator that indicates that the message is an encrypted ARP message. When a NIC receives a message that is indicated as an encrypted ARP message, then the NIC will decrypt the message using secure credentials to obtain the true ARP message. The device will then process the message in accordance standard procedures.

24 Claims, 6 Drawing Sheets

(56) References Cited

U.S. PATENT DOCUMENTS

2009/0307773 A1* 12/2009 Kwan ................. H04L 63/0236
  726/23
2012/0216036 A1* 8/2012 Barsoum et al. ............. 713/160

OTHER PUBLICATIONS

Secure ARP and Secure DHCP Protocols to Mitigate Security Attacks Biju Issac Received Apr. 24, 2007; revised Aug. 31, 2007; and accepted Jan. 30, 2008.*
Design of Secure ARP on MACsec(802.1AE) Jun-Won Lee ; Internet Manage. Technol. Lab., Sungkyunkwan Univ., Suwon, South Korea ; Seon-Ho Park ; Ki-Ho Gum ; Tai-Myoung Chung Ubiquitous Information Technologies and Applications (CUTE), 2010 Proceedings of the 5th International Conference on.*
Bruschi, D.; Ornaghi, A.; Rosti, E., "S-ARP: a secure address resolution protocol," Computer Security Applications Conference, 2003. Proceedings. 19th Annual , vol., No., pp. 66,74, Dec. 8-12, 2003 doi: 10.1109/CSAC.2003.1254311.*

* cited by examiner

SECURE ADDRESS RESOLUTION PROTOCOL

BACKGROUND

Computers and other networked devices are configured for operation and compatibility with their local network environments. These devices can be configured to obtain information about other devices on a local network using a protocol such as Address Resolution Protocol (ARP). When using ARP, a device may broadcast an ARP request on the local network, where the ARP request includes an Internet protocol (IP) address of a destination device. Another device may then reply by broadcasting a media access control (MAC) address corresponding to the IP address that was broadcast. The device may then transmit data directly to the destination device using the MAC address.

Although convenience for trusted devices, ARP may be used by malicious attackers to receive information about other devices on the local network. The malicious attackers may then use the information to intercept or otherwise disrupt or manipulate network communications facilitated by the local network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques that can be used to automatically configure computers, servers, and other networked devices in network environments that may not be controlled or secure. In environments such as these, address resolution and discovery are often insecure and unsupervised, and are therefore susceptible to attacks. As an example, a rogue device can be placed on a local network and used to intercept address information communicated between computers on the local network that broadcast address information, such as by a broadcast address resolution protocol (ARP) message. The rogue device may then send a broadcast message that assign's a media access control (MAC) address of the rogue computer to an IP address used by another one of the devices on the network. The rogue device may then intercept messages that are intended for another device.

In certain embodiments described herein, networked devices are preconfigured with security credentials that allow network interface controllers (NICs) to encrypt outgoing ARP messages and decrypt incoming ARP messages. The NICs may listen for encrypted messages that are recognized as being ARP messages. These encrypted messages may include a designator that indicates that the message is an encrypted ARP message. When a NIC receives a message that is indicated as an encrypted ARP message, then the NIC will decrypt the message using secure credentials to obtain the true ARP message. The device will then process the message in accordance standard procedures.

When a rogue device is placed on the network that uses encrypted ARP messages, the rogue device will be unable to exchange ARP messages with the other devices because the rogue device will not recognize the encrypted ARP messages as being ARP messages. In addition, the other devices will not respond to messages from the rogue device because the messages from the rogue device will not include the designator and/or correct information, when decrypted by a NIC, to cause the NIC to broadcast a recognizable ARP response back to the rogue device. Thus, the rogue device will not be able to decipher messages exchanged on the network as ARP messages and/or communicate ARP requests to the other devices on the network.

The systems and techniques described herein may be implemented in a number of ways. Example implementations are provided below with reference to the following figures.

Figure 1:
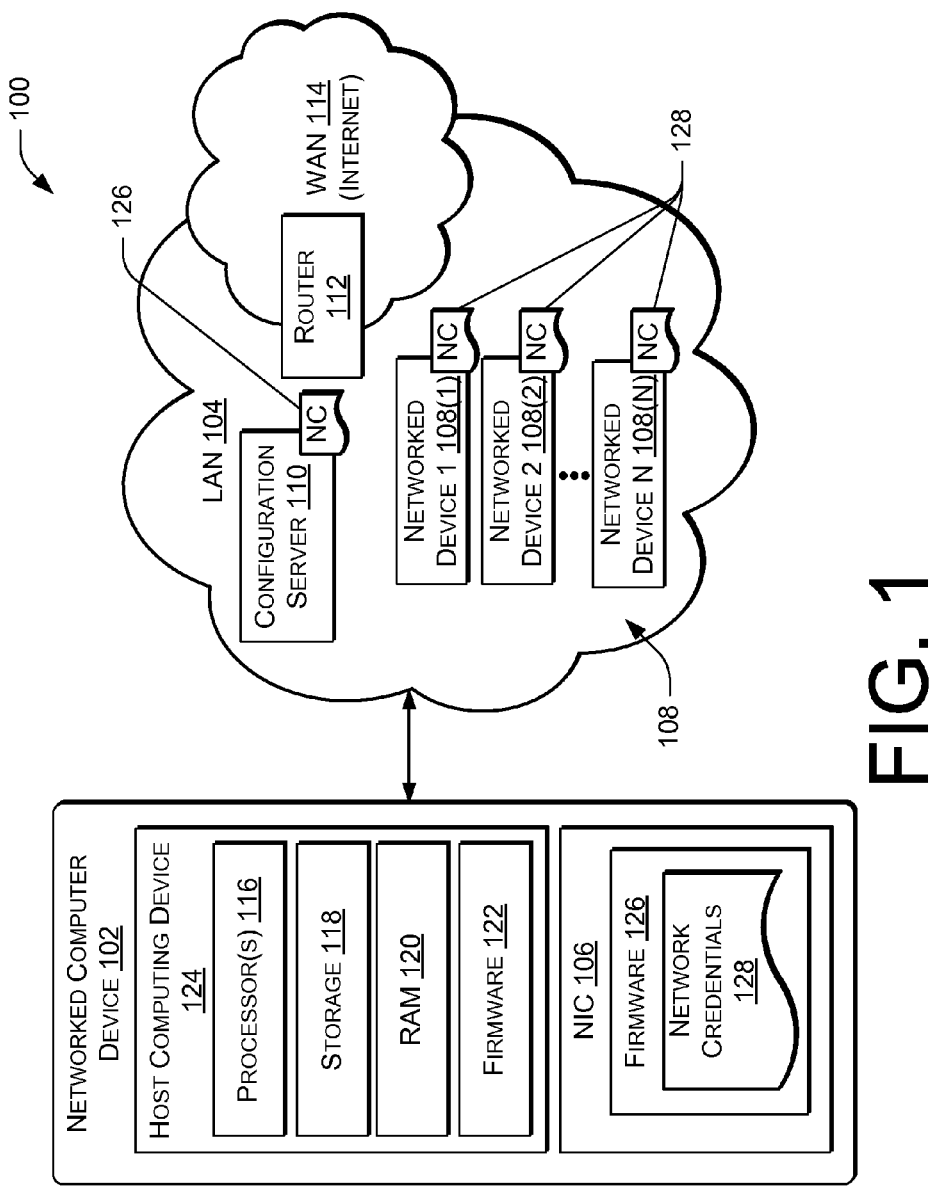
FIG. 1 is a block diagram illustrating a system for securely configuring networked computers using address resolution protocol (ARP).

FIG. 1 shows an environment 100 in which a networked computer device 102, referred to simply as the "computer 102" in the following discussion, is configured to communicate using a local network or local-area network (LAN) 104. In this embodiment, the computer 102 has a network interface controller (NIC) 106 that is configured to enable communications through the local network 104.

The local network 104 may include one or more networked devices 108. For example, the networked devices may include a first networked device 108(1), a second networked device 108(2), . . . , and a last networked device 108(N). The networked devices 108 may be the same as the computer 102, similar to the computer 102, and/or completely different types of devices. The networked devices 108 and the computer 102 may exchange data through the local network 104. In some embodiments, the local network 104 may include a configuration server 110. The configuration server 110 may be used to configure new devices that are added to the network and/or facilitate other operations and/or management of the local network. In some embodiments, the operations of the configuration server 110 may be performed by one of the networked devices 108.

In some embodiments, the local network 104 may also have a network router or gateway 112 that enables communications to and from a wide-area network (WAN) 114, which may be a public network such as the Internet, and which may in turn provide a conduit for communications with a myriad of servers, services, components, and other private networks.

Conventional communications protocols such as the Internet protocol (IP) may be used for communication between the various entities shown in FIG. 1. In particular, IP version 4 (IPV4) and/or version 6 (IPV6) may be used in certain embodiments.

The computer 102 may have one or more processor(s) 116 that execute instructions and programs that are stored in or retrieved from various types of computer-readable memory. Examples of such memory are categorized in FIG. 1 as storage 118, random-access memory (RAM) 120, and BIOS or firmware 122. Storage 118 typically comprises a harddisk or similar non-volatile memory, and may include external devices. RAM 120 may comprise electronic memory or other types of relatively fast, electronically-accessible memory. Firmware 122 may comprise read-only memory (ROM), flash memory, electrically erasable programmable read-only memory (EEPROM), and/or any other type of persistent memory that can be accessed by the processor 116. Firmware 122 may include pre-boot information for the computer 102, such as instructions, modules, and/or routines for initializing itself and for obtaining its operating software. More specifically, the pre-boot information may comprise the instructions that the processor 116 will execute upon being powered on. A host computing device 124 may be comprised of one or more of the processor(s) 116, the storage 118, the RAM 120, and the firmware 122.

The NIC 106 may connect the host computing device 124 to the LAN 104. The NIC 106 may comprise an interface for a wired or wireless network connection, such as an Ethernet interface, a wireless 802.11x interface, a cellular data interface, or some other type of communications interface. The NIC 106 may include its own BIOS or firmware 126, which may be implemented as ROM, flash memory, EEPROM, an integrated circuit, etc., and which may contain initial operating instructions for the NIC 106. The NIC may be an integral part of the computer 102, or may be installable or removable. For example, the NIC may be installable by plugging it into a computer backplane, a USB port, or some other interface of the computer.

At least some of the operations of the computer 102 may be dictated by the computer's firmware 122, by the NIC's firmware 126, or by a combination of both. For example, the firmware 126 of the NIC 106 may be responsible for encrypting/decrypting ARP messages that are broadcast (including unicast) using the local network 104. In some embodiments, the NIC 106 may include an integrated circuit that causes the NIC to encrypt/decrypt the ARP messages and/or causes the NIC to perform other operations. The integrated circuit may be implemented as at least one of an application specific integrated circuit (ASIC) or a field programmable gate array (FPGA).

The computer firmware 122 may be responsible for other things, such as initially communicating with the NIC 106 and other input/output components of the computer 102. In some embodiments the computer firmware 122 may be responsible for network initialization, including initial communications with the configuration server 110, and in some cases the NIC 106 may not have its own dedicated firmware 126.

The firmware 122 or 126 may in some embodiments be further customized to contain network credentials 128. The network credentials 128 allow the computer 102 to encrypt/decrypt ARP messages and thereby exchange ARP messages with the networked devices 108 and the configuration server 110 on the local network 104. Similarly, the networked devices 108 and the configuration server 110 may include the network credentials (NC). The network credentials 128 may include certificates, signatures, credentials, keys, key pairs, and so forth, and may utilize cryptographic elements and techniques. In some embodiments, the network credentials 128 may include device credentials that are unique to the particular networked device.

Note that the term "credentials" is used herein to indicate information that can be used encrypted/decrypt messages and/or to indicate and/or prove the identity and/or authorization of an entity. The term may also refer to information that allows an entity to verify the credentials of another entity. For example, credentials may include the public key corresponding to the private key that is held by another entity.

Figure 2:
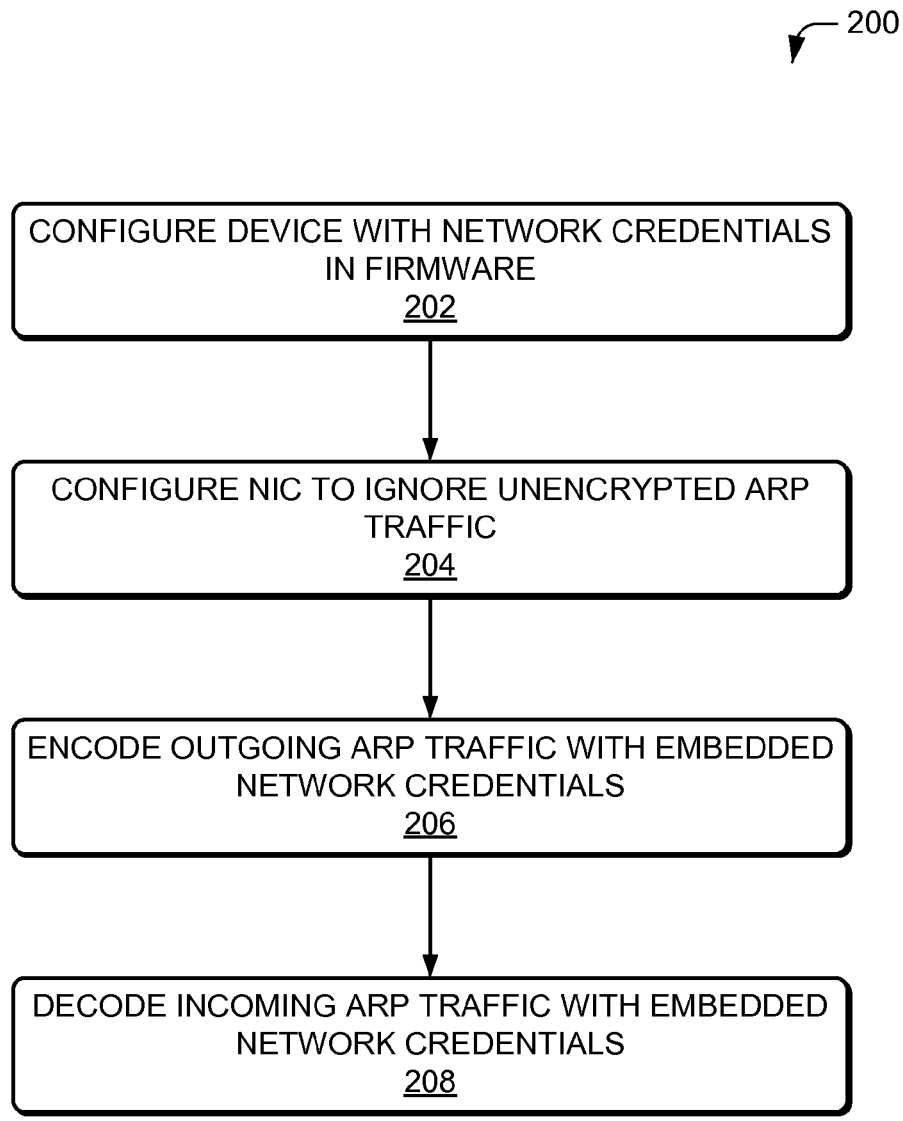
FIG. 2 shows a flow diagram of an illustrative process to implement and use a secure ARP.
Figure 3:
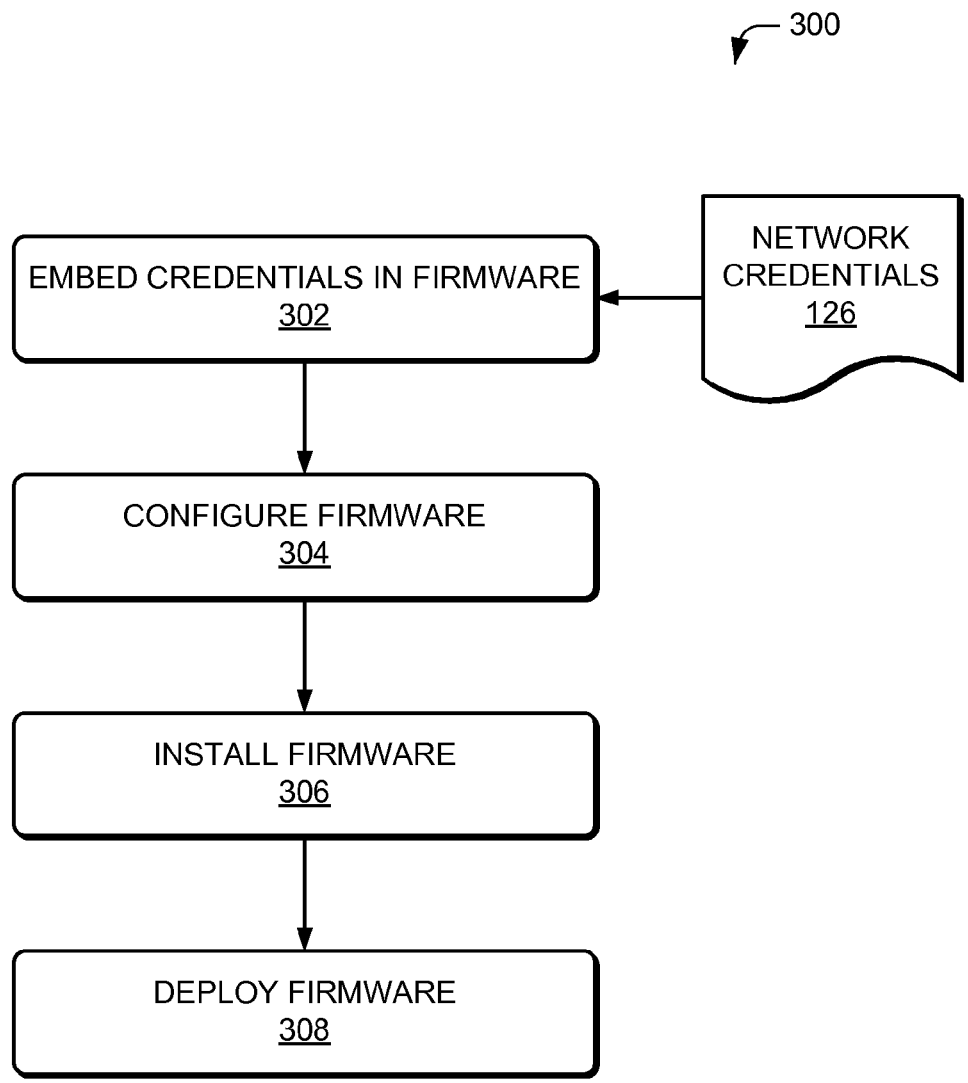
FIG. 3 shows a flow diagram of an illustrative process to initialize the computing device for use on a local network.
Figure 4:
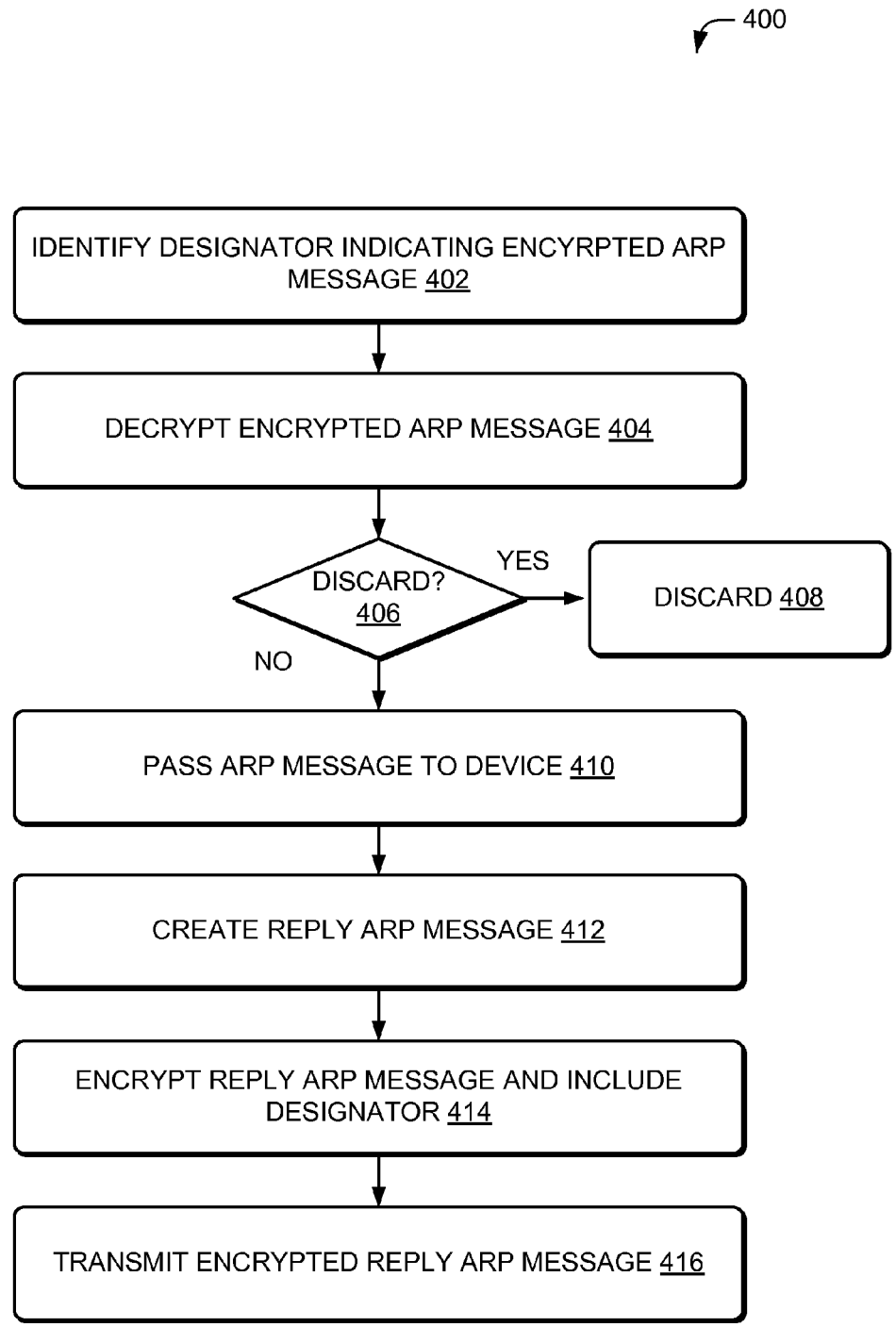
FIG. 4 shows a flow diagram of an illustrative process to process an encrypted ARP message.

FIGS. 2-4 are flow diagrams of illustrative processes to enable secure ARP. The processes are illustrated as a collection of blocks in a logical flow graph, which represent a sequence of operations that can be implemented in hardware, software, or a combination thereof. The blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 2 shows a flow diagram of an illustrative process 200 to implement and use a secure ARP. The process 200 is described with reference to the environment 100 and may be performed in part by the computer 102. Of course, the process 200 may be performed in other similar and/or different environments. For example, the process 200 may also be performed by the networked devices 108 and/or the configuration server 110.

At 202, the computer 102 may be configured with network credentials in the firmware, such as the firmware 122 and/or the firmware 126. In some embodiments, the firmware 122 and/or the firmware 126 may be updated, such as by writing code to the memory (e.g., EEPROM, etc.) that stores the firmware. In various embodiments, the firmware may be formed to include hardware-based instructions that include the network credentials. The network credentials may be credentials that enable encryption and decryption of ARP messages that received or transmitted by the NIC. In some embodiments, the network credentials may include device credentials that identify the networked device. The device credentials may include a unique identifier and/or a unique private key for the device.

At 204, the NIC may be configured to ignore unencrypted ARP traffic. In some instances, the NIC may ignore messages that do not look like encrypted ARP messages and/or that do not include a designator associated with the encrypted ARP messages. Thus, the NIC 106 may ignore unencrypted ARP messages (e.g., normal or conventional ARP messages) while processing, at least partially, encrypted ARP messages. By ignoring unencrypted ARP messages, the NIC prevents a rogue device from communicating with the device, such as to cause an update of the ARP cache with a MAC address of the rogue device. A rogue device, as discussed herein, is a malicious device or an otherwise unauthorized device that attempts to communicate or intercept messages exchanged on the local network 104.

At 206, the NIC 106, using the network credentials 128 in the firmware, may encrypt outgoing ARP messages. The encryption may include adding a designator to the outgoing messages that indicates to other devices that the message is an encrypted ARP message. The encryption may or may not change the properties of the message, such as the number of bytes in the message. In some instances, the operation 206 may encode the outgoing ARP message with embedded network credentials, and thereby change the default form of the ARP message without necessarily encrypting the message.

At 208, the NIC 106, using the network credentials 128 in the firmware, may decrypt incoming encrypted ARP messages. The decryption may convert the encrypted ARP message to an unencrypted ARP message, which may then be selectively passed to the device's operating system (O/S) for processing. The encrypted ARP message may be recognizable by the NIC 106 based on the designator included in the encrypted ARP message and/or properties of the ARP message (e.g., number of bytes, etc.). In some embodiments, the operation 208 may decode the outgoing encoded ARP message that includes embedded network credentials, and thereby change the embedded form of the ARP message to a default form of the ARP message without necessarily decrypting the message.

FIG. 3 shows a flow diagram of an illustrative process 300 to initialize the computing device 102 for use on the local network 104. The process 300 is described with reference to the environment 100 and may be performed in part by the computer 102. Of course, the process 300 may be performed in other similar and/or different environments. For example, the process 300 may also be performed by the networked devices 108 and/or the configuration server 110.

At 302, the network credentials 128 are embedded in the firmware 122 of the computer 102 and/or the firmware 126 of a computer sub-component such as the NIC 106. The network credentials 128 may comprise cryptographic keys, certificates, signatures, tokens, usernames, passwords, and so forth. The network credentials 128 can be used to encrypt/decrypt ARP messages and/or encode/decode ARP messages, among other possible uses.

At 304, the firmware of the computer 102 or computer sub-component may be configured to utilize the network credentials 128, and to perform encryption/decryption of ARP messages and/or encoding/decoding of ARP messages, among other possible uses At 306, the configured firmware may be installed in the computer 102. This may comprise "burning" the firmware to a hardware component of the computer or computer sub-component. The operation 306 may also, or alternatively, comprise physically installing a pre-configured sub-component or other physical element in the computer or computer sub-component. For example, the operation 306 may comprise installing a specially-configured NIC 106 into the computer 102, wherein the NIC 106 has previously been customized in accordance with the operations 302 and 304. Such a NIC card may be installed in a computer backplane, as a removable device such as a USB device, or by otherwise integrating with or attaching to the computer 102.

The firmware installation at the operation 306 may also be performed by attaching or installing a physical media to the computer 102, such as a floppy disk, a CD, a CD-ROM, or analogous media, and by loading the firmware from such media. Similarly, different types of devices may be used to load firmware or other initialization software onto the computer 102, such as different types of media drives, network devices, portable devices, and so forth.

At 308, the computer 102 may deploy the firmware. Once booted or initialized after the firmware is configured, the computer 102 may use network credentials 128 in the firmware when exchanging ARP messages with other devices in the local network 104.

FIG. 4 shows a flow diagram of an illustrative process 400 to process an encrypted ARP message. The process 400 is described with reference to the environment 100 and may be performed in part by the computer 102. Of course, the process 400 may be performed in other similar and/or different environments. For example, the process 400 may also be performed by the networked devices 108 and/or the configuration server 110.

At 402, the NIC 106 of the computer 102 may identify a designator indicating that a message is an encrypted ARP message. The designator may be a portion of the message (e.g., header, prefix, suffix, or other portion of bytes), a format of the message, and/or other identifiable information in the message. In some embodiments, the designator may be identified without decrypting the encrypted ARP message. In some instances, the designator may be added to an encrypted ARP message prior to transmission of the encrypted ARP message. The designator is absent in unencrypted ARP messages.

At 404, the NIC 106 may decrypt the encrypted ARP message using the network credentials 128. The NIC 106 may convert the encrypted ARP message into an unencrypted ARP message.

At 406, the NIC 106 may determine whether or not to discard the unencrypted ARP message. The unencrypted ARP message may be discarded when the unencrypted ARP message is intended for another recipient device or otherwise is not usable by the computer 102. When the NIC 106 determines to discard the unencrypted ARP message (following the "yes" route from the operation 406), then the unencrypted ARP message is discarded, dropped, filtered, or otherwise disposed of at 408. In some instances, the designator may be present in a network packet stream that is not an encrypted ARP. In these situations, the NIC may determine that the message is not an encrypted ARP message through unsuccessful decryption, and then forward the network packet stream accordingly.

When the NIC 106 determines to further process the unencrypted ARP message and not discard the message (following the "no" route from the operation 406), then the unencrypted ARP message is processed at 410. At 410, the NIC 106 may pass the unencrypted ARP message to the operating system (O/S) of the computer 102 for further processing.

At 412, the computer 102 may create a reply ARP message based on the unencrypted ARP message. The reply ARP message may include a MAC address of the computer 102 and/or other information. The reply ARP message may be passed back to the NIC 106 for further processing.

At 414, the NIC 106 may encrypt the reply ARP message and include the designator. The designator may be integral to the encrypted reply ARP message and/or may be an additional part of the message that is added after the encryption. In some embodiments, some of the processing at the operation 414 may be performed by the O/S.

At 416, the NIC 106 may transmit the encrypted reply ARP message to another one or more of the devices in the local network 104.

Figure 5:
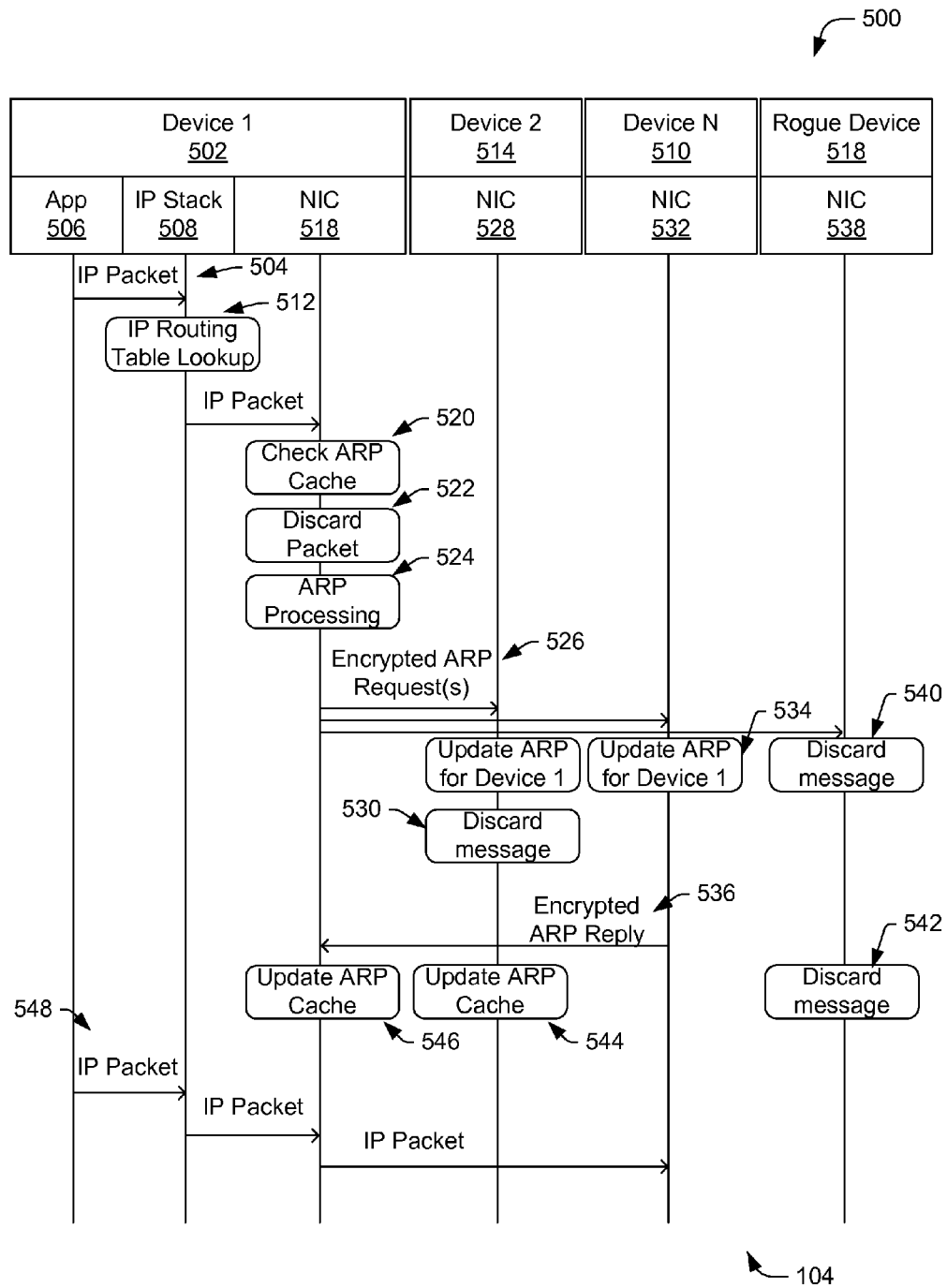
FIG. 5 shows an illustrative data flow diagram showing communication of encrypted ARP messages within the local network.

FIG. 5 shows an illustrative data flow diagram 500 showing communication of encrypted ARP messages within the local network 104. The data flow diagram shows a first device 502 (e.g., the computer 102) attempting to transmit an internet protocol (IP) packet 504 to a destination device. Initially, an application 506 sends the IP packet 504 to an IP stack 508. The IP stack 508 performs an IP routing table lookup at 512 to determine the IP address of a next hop. In this example, the message is being sent to a last device 510 (device N), which is directly connected to the first device 502 on the local network 104. The local network 104 also connects a second device 514 and a rogue device 516. The rogue device is an unauthorized device that does not include the network credentials 128 as described above. Next, the IP packet 504 is passed to an NIC 518 to transmit the message to the destination device.

The NIC 518 references an ARP cache at 520 to determine the MAC address of the destination device to enable transmission of the IP packet to the destination device. In this example, the destination device is the last device 510. The NIC 518 searches the ARP cache to find the MAC address, but is unable to find the address, in this example. The packet may then be discarded at 522 because the MAC address cannot be found.

The NIC 518 may initiate ARP processing at 524 to determine the MAC address of the destination device and update the ARP cache. The NIC 518 may encrypt an ARP request and then broadcast the encrypted ARP request to devices on the local network 104. The encrypted ARP request may include a designator that indicates to the other devices that the message is an encrypted ARP message.

The second device 514 may receive the encrypted ARP request, via an NIC 528. The NIC 528 may recognize the message as an encrypted ARP message and then decrypt the encrypted ARP request. The NIC 528 may then check its ARP cache to determine if it has a mapping between the sources protocol address and the source hardware address (i.e., mapping of the IP address to the MAC address of the first device 502) at 528. If a mapping is not found, the ARP cache may be updated to include the mapping of the MAC address to the IP address of the first device 502. Since this ARP request does not target the second device 514, the message may be discarded at 530.

The last device 510 may also receive the encrypted ARP request, via an NIC 532. The NIC 528 may recognize the message as an ARP message and then decrypt the encrypted ARP request. The NIC 528 may then check its ARP cache to determine if it has a mapping between the sources protocol address and the source hardware address (mapping of the IP address to the MAC address of the first device 502) at 534. Since the destination protocol address in the ARP request matches its own IP address, the NIC 532 creates an ARP reply addressed to the first device 502. The NIC 532 encrypts the ARP reply to create an encrypted ARP reply and then transmits the encrypted ARP reply at 536.

Meanwhile, the rogue device 516 may also receive the encrypted ARP request, via an NIC 538. However, since the NIC 538 does not include the network credentials 128, the NIC 538 does not recognize the message as an encrypted ARP message. Even if the NIC 538 recognizes the message as an encrypted ARP message, the NIC 538 cannot decrypt the message to determine the message's contents. Thus, the NIC 538 discards the message at 540. Notably, unlike the NIC 528, the NIC 538 is unable to update its ARP cache based on the broadcast at 526 from the NIC 518.

Returning to the transmission of the encrypted ARP reply at 536, the encrypted ARP reply is receivable by all the devices on the local network 104. However, since the NIC 538 of the rogue device 516 does not recognize the message as an encrypted ARP message, the NIC 538 will discard the message at 542 and gain no information about the local network 104 or other devices on the local network 104.

In contrast, the NIC 528 of the second device 514 will receive the message, recognize it as an encrypted ARP messaged based in the designator, and then decrypt the message using the network credentials 128. The NIC 528 may then update its ARP cache at 544 to include the mapping of the MAC address to the IP address for last device 510.

Meanwhile, the NIC 518 of the first device 502 will receive the message, recognize it as an encrypted ARP messaged based in the designator, and then decrypt the message using the network credentials 128. The NIC 518 may then update its ARP cache at 546 to include the mapping of the MAC address to the IP address for last device 510.

At 548, the first device 502 may then send (resend) the IP packet. The NIC 518 will find the MAC address of the last device 510 in the ARP cache because the ARP cache was updated at 546. Thus, the NIC 518 can transmit the IP packet directly to the last device 510 via the local network 104 using the MAC address of the last device 510.

During the processing discussed in the data flow diagram 500, the NIC 538 of the rogue device 516 is unable to recognize and/or decrypt ARP messages. Further, any ARP requests sent by the NIC 538 of the rogue device 516 will not be encrypted and will not include the designator. Thus, these messages sent by the NIC 538 of the rogue device 516 will be ignored by the other devices. This effectively prevents the rogue device from "ARP snooping" or otherwise impersonating another device on the network using information gained by listening to ARP messages because the NIC 538 of the rogue device 516 is unable to listen to, or even recognize, the ARP messages.

Figure 6:
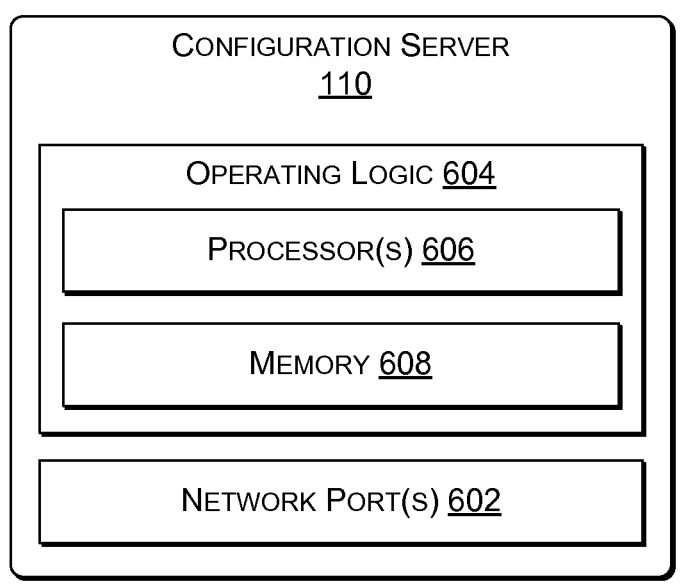
FIG. 6 is a block diagram showing high-level components of an example configuration server.

FIG. 6 shows an example implementation of the configuration server 110. The functions of a configuration server may comprise any of various types of devices, including networked computers and other networked components such as routers, switches, hubs, access points, and so forth. Generally, such devices one or more network ports 602 and operating logic 604 that uses the network ports 602 to communicate with networked devices or hosts. The operating logic in some embodiments may comprise one or more processors 606 and associated computer-readable memory 608. The memory 608 contains instructions that are executable by the one or more processors 606 to implement the functionality described above with reference to the configuration server 110. The memory 608 and its instructions may in some cases comprise device firmware. In other cases, the instructions may be stored in other types of computer-readable memory such as system memory, disk memory, electronic memory, and so forth. The instructions may also be distributed on various types of computer-readable memory such as various types of disks and portable electronic media.

Architectures other than those described above may be used to implement the described functionality, including the functionality of the computer 102 and the configuration server 110. Furthermore, although specific distributions of responsibilities are defined above for purposes of discussion, the various described functions and responsibilities might be distributed and divided in different ways, depending on particular circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A networked device, comprising:
   a host computing device; and
   a network interface controller (NIC) to connect the host computing device to a local network, the NIC including firmware that specifies network credentials, the NIC including an integrated circuit that causes the NIC to perform actions comprising:
receiving a message from at least one other device on the local network;
determining that the message includes a designator associated with an encrypted address resolution protocol (ARP) message;
determining that the message is not able to be decrypted to obtain a valid ARP message; and
forwarding the message to the host computing device.

2. The networked device of claim 1, wherein the message comprises a first message, and the integrated circuit causes the NIC to perform actions further comprising:
receiving a second message from the at least one other device on the local network;
determining that the second message includes a designator associated with a second encrypted address resolution protocol (ARP) message;
determining that the second message is able to be decrypted to obtain a valid ARP message;
decrypting the second message using the network credentials to determine contents of the valid ARP message; and
forwarding the contents of the valid ARP message to the host computing device.

3. The networked device of claim 1, wherein the designator is indicated by a predetermined portion of the bytes of the message.

4. The networked device of claim 1,
wherein the host computer device includes:
one or more processors; and
computer-readable memory containing instructions that are executable by the one or more processors to perform an action comprising:
creating a reply ARP message to transmit to a destination device on the local network; and
wherein the NIC performs actions that further comprise:
encrypting the reply ARP message using the network credentials; and
transmitting the encrypted reply ARP message to the destination device.

5. The networked device of claim 1, wherein the firmware comprises electrically erasable programmable read-only memory (EEPROM).

6. The networked device of claim 1, wherein the integrated circuit is at least one of an application specific integrated circuit (ASIC) or a field programmable gate array (FPGA).

7. The networked device of claim 1, wherein the networked credentials include one or more key pairs to encrypt and decrypt messages.

8. The networked device of claim 1, wherein the message comprises a first message, and the integrated circuit causes the NIC to perform actions further comprising:
receiving a second message from the at least one other device on the local network;
receiving a third message from the at least one other device on the local network;
determining that the designator is absent from the third message; and
filtering the third message.

9. A method, comprising:
receiving, by a network interface controller (NIC), a message from at least one networked device on a local network;
determining that the message includes a designator associated with an encrypted address resolution protocol (ARP) message;
determining that the message is not able to be decrypted to obtain a valid ARP message; and
forwarding the message to a host computing device.

10. The method of claim 9, wherein the message comprises a first message;
receiving, by the NIC, a second message from the at least one networked device on the local network;
determining that the second message includes a designator associated with a second encrypted address resolution protocol (ARP) message;
determining that the second message is able to be decrypted to obtain a valid ARP message;
decrypting the second message using secure network credentials, wherein the secure network credentials include one or more key pairs to encrypt and decrypt messages; and
forwarding the contents of the valid ARP message to the host computing device.

11. The method of claim 10, further comprising:
creating a reply ARP message to the second message, the reply ARP message to transmit to a destination device on the local network;
encrypting the reply ARP message using the network credentials; and
transmitting the encrypted reply ARP message to the destination device.

12. The method of claim 11, further comprising adding a designator to the encrypted reply ARP message prior to the transmitting.

13. The method of claim 10, wherein the decrypting is performed by an integrated circuit of the NIC.

14. The method of claim 9, wherein the designator is a predetermined format of the encrypted ARP message.

15. The method of claim 9, wherein the designator is included in a prefix or header of the encrypted ARP message.

16. The method of claim 9, wherein the network credentials are stored in firmware that is only accessible by the NIC of the networked device.

17. The method of claim 9, wherein the firmware is comprised of at least one of electrically erasable programmable read-only memory (EEPROM) or an integrated circuit.

18. One or more computer-readable memory storing instructions executable by one or more processors to perform operations comprising:
receiving, by a network interface controller (NIC), a message from at least one networked device on a local network;
determining that the message includes a designator associated with an encrypted address resolution protocol (ARP) message;
determining that the message is not able to be decrypted to obtain a valid ARP message; and
forwarding the message to a host computing device.

19. The one or more computer-readable memory of claim 18, wherein the message comprises a first message, the operations further comprising:
receiving, by the NIC, a second message from the at least one networked device on the local network;
determining that the second message includes a designator associated with a second encrypted address resolution protocol (ARP) message;
determining that the second message is able to be decrypted to obtain a valid ARP message;

decrypting the second message using secure network credentials, wherein the secure network credentials include one or more key pairs to encrypt and decrypt messages; and forwarding the contents of the valid ARP message to the host computing device.

20. The one or more computer-readable memory of claim 19, the operations further comprising:

creating a reply ARP message to the second message, the reply ARP message to transmit to a destination device on the local network;

encrypting the reply ARP message using the network credentials; and transmitting the encrypted reply ARP message to the destination device.

21. The one or more computer-readable memory of claim 20, the operations further comprising:

adding a designator to the encrypted reply ARP message prior to the transmitting.

22. The one or more computer-readable memory of claim 19, wherein the decrypting is performed by an integrated circuit of the NIC.

23. A system comprising:

one or more processors; and one or more computer-readable memory storing instructions executable by the one or more processors to perform operations comprising:

receiving, by a network interface controller (NIC), a message from at least one networked device on a local network;

determining that the message includes a designator associated with an encrypted address resolution protocol (ARP) message;

determining that the message is not able to be decrypted to obtain a valid ARP message; and forwarding the message to a host computing device.

24. The system of claim 23, wherein the designator is a predetermined format of the encrypted ARP message.

* * * * *